May 20, 1941.　　　F. E. LOOMIS　　　2,242,710
DISTRIBUTOR ATTACHMENT FOR LAWN MOWERS
Filed July 11, 1939
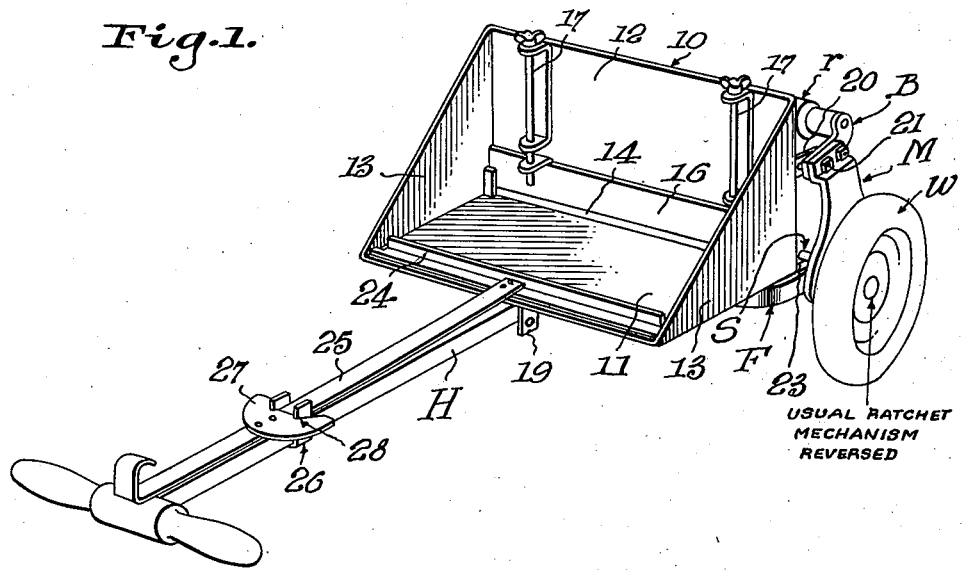
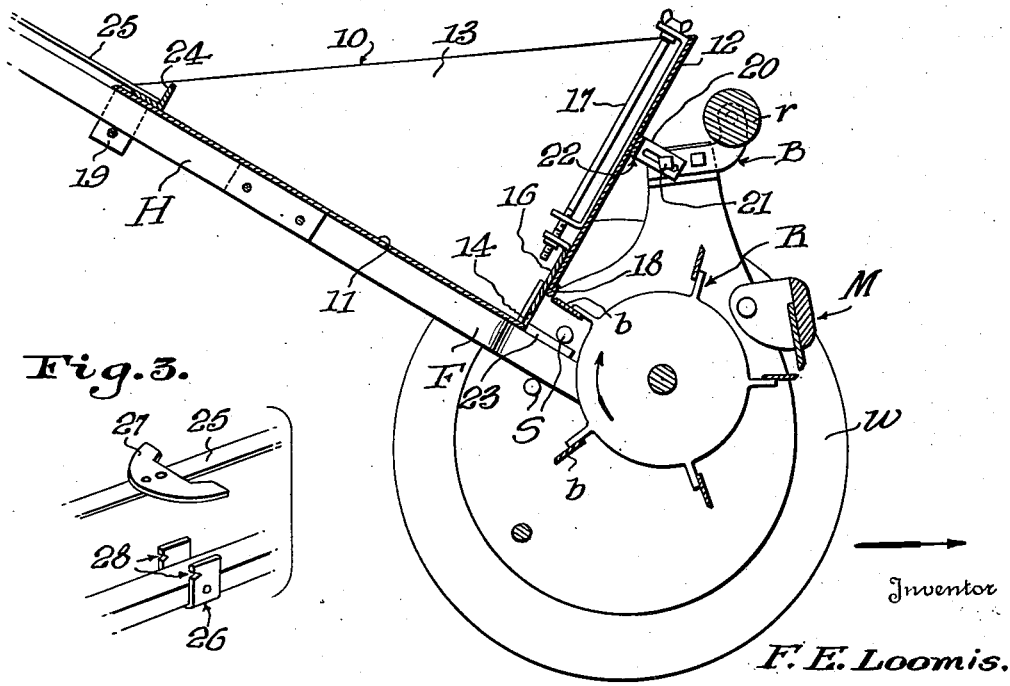
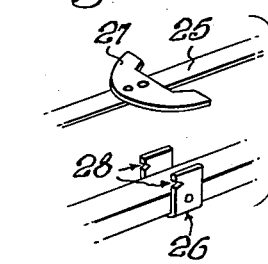

Patented May 20, 1941

2,242,710

UNITED STATES PATENT OFFICE 2,242,710

DISTRIBUTOR ATTACHMENT FOR LAWN MOWERS

Francis Eugene Loomis, Kearney, Nebr.

Application July 11, 1939, Serial No. 283,879

5 Claims. (Cl. 275—2)

The invention relates to a novel attachment for lawn mowers of such nature that fertilizer, seed, insecticide or other material may be effectively distributed, upon lawns, or other surfaces.

The invention aims to provide a simple and inexpensive distributor which can be readily attached to a conventional lawn mower; to make novel provision whereby the blades of the usual rotary reel of the mower may tap a portion of the attachment to facilitate the discharge of material therefrom; to utilize the lawn mower in an inverted position with the usual ratchet mechanisms reversed to reversely drive the reel when the mower is pushed, causing the beveled edges of the reel blades to produce the required tapping action for vibration and feeding of material; to provide an attachment in which the discharge of material is effected jointly by gravitation and vibration; and to provide a device which can be easily attached to almost all modern makes of mowers with little or no change in construction.

With the above and minor objects in view the invention resides in the novel subject matter hereinafter described and claimed, description being accomplished by reference to the accompanying drawing.

Figure 1 is a perspective view of an inverted lawn mower and the attachment secured thereto.

Figure 2 is a longitudinal sectional view on a larger scale, parts being broken away.

Figure 3 is a detail perspective view.

The construction selected for illustration may be considered as preferred, but it is to be understood that within the scope of the invention as claimed, numerous variations may be made.

The invention may be used with any conventional lawn mower M in which the wheels W are utilized to drive the reel R by means of ratchet mechanisms, said reel having the customary helically pitched blades. The mower is used in an inverted position and its ratchet mechanisms are reversed to cause the reel R to travel reversely from its ordinary direction of travel, when the inverted mower is pushed forwardly. For subsequent reference, the handle of the mower is denoted at H, the furcations of the forked front end of this handle are shown at F and the stops for limiting the vertical swinging of the handle by contact with said furcations, are shown at S. Also, the brackets which carry the usual roller $r$ are denoted at B.

The attachment includes a hopper 10 for the material to be distributed, said hopper having a bottom 11 to rest on the forked front end of the mower handle. The hopper also includes a front wall 12 and suitably shaped side walls 13, said front wall 12 being spaced above the front edge of the bottom 11 to provide a discharge slot 14 for the material to be distributed. In order to regulate the effective size of this slot according to the material being spread, I provide a suitable gate 16 which may be vertically adjusted by suitable screws or the like 17. The hopper 10 is provided with a portion 18 which, when said hopper is secured to the mower, is so positioned as to be successively tapped by the blades $b$ of the reel R, thereby so vibrating the attachment as to facilitate the discharge of the material through the slot 14. In the present showing, the portion 18 is in the form of a horizontally elongated strip or other bead on the lower edge of the front wall 12. This wall and other portions of the hopper are preferably formed from galvanized sheet metal and the portion 18 may be formed by folding the metal of said front wall one or more times upon itself. This metal being relatively soft will not injure the blades $b$ of the reel R as only the bevels of these blades strike said portion as the reel is reversely driven.

For securing the hopper 10 to the mower, any suitable provision may be made. I prefer, however, to provide the hopper bottom 11 with a clamp 19 to embrace the handle H and to provide the hopper wall 12 with forwardly projecting arms 20 to be bolted at 21 to the roller brackets B. The arms 20 are preferably formed by forwardly bending the ends of a metal strap or the like 22 which may be riveted or otherwise secured to the front wall 12. These arms are preferably slotted to permit such adjustment of the hopper as to insure proper tapping of the reel blades $b$ against the portion 18 of the hopper.

If desired, the hopper 10 may be provided with additional forwardly projecting arms 23 for reception between the handle furcations F and certain of the stops S which cooperate with said furcations ordinarily to limit the vertical swinging of the handle. If the hopper 10 be itself sufficiently rigid, it will prevent any swinging of the mower handle with respect to the mower frame when secured in place, but the arms 23 may be provided as an additional safeguard if desired.

A "stop-gap" or valve member 24 is provided to rest upon the hopper bottom 11 and close the slot 14, when filling the hopper and rolling the machine to the place at which it is to be used. This "stop-gap" or valve member is then either rearwardly moved to the inoperative position shown, or may be entirely removed. I preferably leave the member 24 in the position shown and provide this member with a rearwardly projecting handle 25 which lies upon the mower handle H. This handle 25 and the mower handle are of course both inclined when the machine is being operated, and I, therefore, make provision for holding the handle 25 against downward sliding, said provision preferably consisting of a U-shaped member 26 secured to and straddling the handle H, and a twin wedge-hook 27 secured to the handle 25. The upper ends of the U-shaped member 26 project upwardly from the handle H astride the handle 25 and have notches 28 in their rear edges, with which the hook 27 may be engaged. By pulling the handle 25 rearwardly to a slight extent, however, the hook may be disengaged from the notches and said handle 25 may then be pushed forwardly, causing the valve member 24 to close the slot 14 in readiness for refilling the hopper. The attachment may be used to distribute any desired material, the gate 16 being adjusted as required. When the inverted mower with the attachment applied thereto is pushed forwardly, the reel blades b strike the portion 18 of the hopper 10, thus vibrating the same to facilitate the feeding of the material to the slot 14 and through said slot to the ground, forwardly and between the mower wheels. The vibration of the hopper of course occurs between its points of anchorage to the mower. Thus the mower reel causes the vibration and scatters the material evenly; the hopper being the recipient of this reel action and the receptacle for holding and delivering the material to the exit. This is the operation of the distributor and rotating mower blades working together.

From the foregoing, taken in connection with the accompanying drawing, it will be seen that novel and advantageous provision has been made for carrying out the objects of the invention. While preferred features have been illustrated, attention is again invited to the possibility of making numerous variations within the scope of the invention as claimed, the present disclosure being illustrative rather than limiting. For instance, mowers worn to a degree to be no longer usable as such, can receive the distributing attachment permanently for distributing purposes only and be used therefor without reversing the ratchet mechanism, by pulling the mower-distributor.

I claim:

1. In combination with a conventional lawn mower having a reel provided with blades; a material distributing attachment mounted on said mower and having an outlet for the material to be distributed, said attachment having a portion positioned to be tapped by said blades as said reel rotates, whereby said blades will vibrate the attachment to facilitate discharge of material therefrom.

2. In combination with a conventional lawn mower disposed in inverted position and having its ratchet mechanisms reversed, to drive the usual reel reversely when the inverted mower is pushed, said reel having the customary blades; a material distributing attachment mounted on said inverted mower and having a material outlet, said attachment having a portion positioned to be successively tapped by said blades of said reel as the latter rotates, whereby said blades will vibrate said attachment to facilitate the discharge of material through said outlet.

3. In combination with a conventional lawn mower disposed in inverted position and having its ratchet mechanisms reversed, to drive the usual reel reversely when the inverted mower is pushed, said reel having the customary blades; a material distributing attachment mounted on said inverted mower and including a hopper for the material to be distributed, said hopper having a forwardly declined bottom and a front wall spaced upwardly from said bottom to provide a material discharge slot, said front wall having a portion positioned to be tapped by said blades of said reel as the latter rotates, whereby said blades will vibrate said hopper to feed the material to and through said slot.

4. A distributing attachment for a conventional rotary-reel lawn mower having the usual reel blades; comprising a hopper having an outlet for the material to be distributed, and means for mounting said hopper upon the lawn mower, said attachment having a portion to be tapped by the blades of the mower reel, to vibrate said attachment and facilitate discharge of the material.

5. A distributing attachment for an inverted conventional rotary-reel lawn mower having the usual reel blades and forked handle; comprising a hopper for the material to be distributed, said hopper having a bottom to rest upon the forked mower handle, said hopper also having a front wall spaced above the front edge of said bottom to provide a material discharge slot, and means for securing said hopper to the mower, said hopper having a portion to be tapped by the blades of the mower reel, whereby said hopper will be vibrated to facilitate the discharge of material through said slot.

FRANCIS E. LOOMIS.